(12) United States Patent
Konishi et al.

(10) Patent No.: US 11,299,603 B2
(45) Date of Patent: Apr. 12, 2022

(54) POLYAMIDE RESIN COMPOSITION

(71) Applicant: ASAHI KASEI KABUSHIKI KAISHA, Tokyo (JP)

(72) Inventors: Miho Konishi, Tokyo (JP); Yuki Mori, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 366 days.

(21) Appl. No.: 16/342,784

(22) PCT Filed: Oct. 17, 2017

(86) PCT No.: PCT/JP2017/037610
§ 371 (c)(1),
(2) Date: Apr. 17, 2019

(87) PCT Pub. No.: WO2018/074495
PCT Pub. Date: Apr. 26, 2018

(65) Prior Publication Data
US 2019/0256684 A1 Aug. 22, 2019

(30) Foreign Application Priority Data
Oct. 19, 2016 (JP) .............................. JP2016-205310

(51) Int. Cl.
| | |
|---|---|
| C08K 7/14 | (2006.01) |
| C08K 3/40 | (2006.01) |
| C08K 9/06 | (2006.01) |
| C08K 9/08 | (2006.01) |
| C08L 77/06 | (2006.01) |
| G10K 11/162 | (2006.01) |
| G10K 11/172 | (2006.01) |
| F02F 7/00 | (2006.01) |
| F02F 1/00 | (2006.01) |
| F02F 1/24 | (2006.01) |
| F16H 7/06 | (2006.01) |
| F02M 35/12 | (2006.01) |
| F16H 7/02 | (2006.01) |
| B60N 2/80 | (2018.01) |
| A47C 7/38 | (2006.01) |
| B60G 21/055 | (2006.01) |
| B60K 5/12 | (2006.01) |
| F16F 15/08 | (2006.01) |
| F16G 1/00 | (2006.01) |
| F16G 13/02 | (2006.01) |

(52) U.S. Cl.
CPC .................. *C08K 7/14* (2013.01); *C08K 3/40* (2013.01); *C08K 9/06* (2013.01); *C08K 9/08* (2013.01); *C08L 77/06* (2013.01); *F02F 1/00* (2013.01); *F02F 1/24* (2013.01); *F02F 7/00* (2013.01); *F02M 35/12* (2013.01); *F16H 7/02* (2013.01); *F16H 7/06* (2013.01); *G10K 11/162* (2013.01); *G10K 11/172* (2013.01); *A47C 7/38* (2013.01); *B60G 21/055* (2013.01); *B60G 2206/11* (2013.01); *B60G 2206/71* (2013.01); *B60G 2206/81012* (2013.01); *B60K 5/12* (2013.01); *B60N 2/80* (2018.02); *C08K 2201/003* (2013.01); *C08L 2205/06* (2013.01); *F02F 7/006* (2013.01); *F16F 15/08* (2013.01); *F16F 2224/02* (2013.01); *F16F 2226/00* (2013.01); *F16G 1/00* (2013.01); *F16G 13/02* (2013.01)

(58) Field of Classification Search
CPC ... C08K 7/14; C08K 3/40; C08K 9/06; C08K 9/08; C08K 2201/003; C08L 77/06; C08L 2205/06; G10K 11/162
USPC ........................................................ 523/206
See application file for complete search history.

(56) References Cited

U.S. PATENT DOCUMENTS

| | | | | |
|---|---|---|---|---|
| 4,086,295 | A * | 4/1978 | Mori ....................... | C08L 77/00 525/183 |
| 6,890,984 | B2 * | 5/2005 | Aramaki ................. | C08K 3/32 524/425 |
| 2013/0085229 | A1 | 4/2013 | Sasaki et al. | |
| 2013/0209784 | A1 * | 8/2013 | Nakagawa ............. | C08L 77/00 428/314.8 |
| 2017/0321032 | A1 * | 11/2017 | Shimizu .................. | C08K 3/28 |

FOREIGN PATENT DOCUMENTS

| | | |
|---|---|---|
| EP | 0682057 A1 | 11/1995 |
| JP | 4-77554 | 3/1992 |
| JP | 5-125278 | 5/1993 |
| JP | 6-313045 | 11/1994 |
| JP | 7-304970 A | 11/1995 |
| JP | 2001-72864 | 3/2001 |
| JP | 2001-219437 | 8/2001 |
| JP | 2005-29628 | 2/2005 |
| JP | 2006-56938 | 3/2006 |
| JP | 2007-269914 A | 10/2007 |

(Continued)

OTHER PUBLICATIONS

Machine Translation of JP 06-313045 (Year: 1994).*

(Continued)

*Primary Examiner* — Hannah J Pak
(74) *Attorney, Agent, or Firm* — Greenblum & Bernstein, P.L.C.

(57) ABSTRACT

A polyamide resin composition contains a polyamide resin and an inorganic filler. 90 mass % or more of polyamide 66 is contained relative to 100 mass % of the polyamide resin. The inorganic filler content is ≥30 mass % relative to 100 mass % of the composition. The composition has a solidifying point of ≥210° C. The composition has a spiral flow value of ≥60 cm when the inorganic filler content is ≥30 mass % and <40 mass %, ≥40 cm when the content is ≥40 mass % and ≤50 mass %, and ≥20 cm when the content is >50 mass % and ≤70 mass %. The composition has a strain of ≤3.8% in a 1000-hour tensile creep test under 120° C. and 60 MPa. The composition has a formic acid relative viscosity (VR) of 30<VR<40.

16 Claims, 1 Drawing Sheet

(56) References Cited

FOREIGN PATENT DOCUMENTS

| JP | 2010-31210 | 2/2010 |
|---|---|---|
| JP | 2013-119609 | 6/2013 |
| JP | 5328079 B2 | 8/2013 |

OTHER PUBLICATIONS

Supplementary ESR for EP App. No. 17 86 2519.0 dated Feb. 21, 2020.
Third Party Observations filed in JP App. No. 2018-546370 dated Dec. 23, 2019.
Fulmer, "A Novel Additive for Nylon Enabling High Flow, Metal Release and Enhanced Physical Properties", Struktol Company of America, InnoPlast Plastic Modification Conference, Caesar's Palace, Las Vegas, NV, Oct. 18, 2012 (19 pages).
ISR for PCT/JP2017/037610, dated Feb. 13, 2018.
Written Opinion for PCT/JP2017/037610, dated Feb. 13, 2018 (w/ translation).

* cited by examiner

POLYAMIDE RESIN COMPOSITION

CROSS-REFERENCE TO RELATED APPLICATIONS

This application is a National Phase Entry of PCT International Application No. PCT/JP2017/037610 filed on Oct. 17, 2017, which claims priority under 35 U.S.C § 119(a) to Japanese Patent Application No. 2016-205310 filed on Oct. 19, 2016. Each of the above applications is hereby expressly incorporated by reference, in its entirety, into the present application.

TECHNICAL FIELD

The present disclosure relates to a polyamide resin composition having superior liquidity, mechanical strength, and creep characteristics.

BACKGROUND ART

Polyamide resins are used in various fields of industry, including apparel, industrial materials, automobiles, electric and electronic parts, and other industrial products, because of their superior mechanical properties (such as mechanical strength, rigidity, impact resistance, etc.), heat resistance, and chemical resistance.

Recently, in particular, polyamide resins having good liquidity are demanded in order to achieve thinner automobile parts for the purpose of weight reduction to improve fuel efficiency, or to achieve more compact and higher precision electric and electronic parts.

Improvement of the liquidity is commonly achieved by controlling viscosity. Japanese Unexamined Patent Publication No. H4-77554 (hereinafter, Patent Literature 1) teaches that both the liquidity and rigidity can be ensured by using a polyamide resin composition that has a relative viscosity of 2.3 or less in a 98% concentrated sulfuric acid solution and a fibrous strengthening material in combination. However, in order to ensure the relative viscosity in concentrated sulfuric acid of 2.3 or less, it is necessary that the formic acid relative viscosity VR is less than 30. In the case of Patent Literature 1, it is necessary to add a branched polymer or polyamide 6 to ensure this range of VR (a sulfuric acid relative viscosity of 2.35±0.25 is equivalent to a formic acid relative viscosity of 27±2). While the liquidity can be improved and the rigidity can be ensured by controlling the concentrated sulfuric acid relative viscosity to be 2.3 or less and using the fibrous strengthening material in combination, this approach has suffered problems of low strength and low creep characteristics.

In addition, low molecular-weight polyamides can also be produced by add a molecular weight controlling agent (such as a monocarboxylic acid or a monoamine) during polymerization. However, with this method, in a case where a dicarboxylic acid or a monocarboxylic acid is added, the resulting polyamide has an extremely low terminal amino group content. Thus, in a case where glass fiber is combined, wettability between the polyamide and the glass fiber is poor, making it difficult to achieve desired mechanical strength and creep characteristics.

Japanese Unexamined Patent Publication No. 2006-56938 (hereinafter, Patent Literature 2) teaches that moldability and appearance are improved by using a polyamide composition comprising PA66 that has a melt viscosity in the range from 40 to 150 Pas with 50 mass % of glass fiber added thereto. However, Patent Literature 2 does not mention about long-term creep characteristics. Further, in order to achieve this range of melt viscosity by adding 50 mass % of glass fiber, it is necessary that the resin has a formic acid relative viscosity VR of as low as less than 30. Thus, it is estimated that the polyamide composition taught in Patent Literature 2 cannot achieve sufficient creep characteristics.

Still further, Japanese Unexamined Patent Publication No. 2010-31210 (hereinafter, Patent Literature 3) teaches that a polyamide resin composition comprising 1 to 20 parts by mass of a polyamide oligomer which has a carbon number per amide group of 15 or more and 30 or less and a number-average molecular weight of 2000 or more and 9000 or less relative to 100 parts by mass of a polyamide resin exhibits superior liquidity during molding. However, the addition of the low molecular weight polyamide causes such problems as lowering of mechanical physical properties, such as tensile strength and bend strength, and decrease of thermal stability during molding, which may cause gas formation and/or mold deposit of the resin accumulated in a molding machine.

SUMMARY

As described above, the method of Patent Literature 1 can improve liquidity; however, it is not able to ensure sufficient mechanical strength. The methods of Patent Literature 2 and 3 are not sufficient in view of improving liquidity while ensuring mechanical strength, and can only provide low creep characteristics.

In view of the above-described circumstances, the present disclosure is directed to providing a polyamide resin composition that is suitable for forming thin automobile parts, and the like, having low warpage, and being highly reliable for long-term use.

The polyamide resin composition of the present disclosure is a polyamide resin composition comprising (A) a polyamide resin and (B) an inorganic filler, wherein:

the (A) polyamide resin comprises polyamide 66 in an amount of 90 mass % or more relative to 100 mass % of the polyamide resin;

the (B) inorganic filler is contained in an amount of 30 mass % or more relative to 100 mass % of the polyamide resin composition;

the polyamide resin composition has a solidifying point of 210° C. or more;

the polyamide resin composition has a spiral flow value in a flat spiral mold having a cavity width of 10 mm and a thickness of 2 mm, the spiral flow value being 60 cm or more under the conditions of a set temperature of 285° C., a mold temperature of 80° C., and an injection pressure of 70 MPa when the content of the (B) inorganic filler is 30 mass % or more and less than 40 mass %, being 40 cm or more under the conditions of a set temperature of 285° C., a mold temperature of 80° C., and an injection pressure of 70 MPa when the content of the (B) inorganic filler is 40 mass % or more and not greater than 50 mass %, and being 20 cm or more under the conditions of a set temperature 295° C., a mold temperature of 80° C., and an injection pressure of 70 MPa when the content of the (B) inorganic filler is greater than 50 mass % and not greater than 70 mass %;

the polyamide resin composition has a strain of 3.8% or less measured in a 1000-hour tensile creep test under the conditions of 120° C. and 60 MPa, and the polyamide resin composition has a formic acid relative viscosity VR in the range of 30<VR<40.

It is preferred that the polyamide resin composition have a tensile strength that is measured according to ISO 527, the tensile strength being greater than 195 MPa when the content of the (B) inorganic filler is 30 mass % or more and less than 40 mass %, being greater than 240 MPa when the content of the (B) inorganic filler is 40 mass % or more and not greater than 50 mass %, and being greater than 250 MPa when the content of the (B) inorganic filler is greater than 50 mass % and not greater than 70 mass %.

It is preferred that the (B) inorganic filler comprise glass fiber.

It is preferred that the glass fiber have an average minor diameter of 12 μm or less.

It is preferred that the glass fiber comprise an acid copolymer as a binder.

It is preferred that the (B) inorganic filler be surface-treated with an amino silane.

A cylinder head cover of the disclosure is produced by molding the polyamide resin composition of the disclosure.

An oil pan of the disclosure is produced by molding the polyamide resin composition of the disclosure.

An engine mount or a torque rod of the disclosure is produced by molding the polyamide resin composition of the disclosure.

A head rest component of the disclosure is produced by molding the polyamide resin composition of the disclosure.

A resonator of the disclosure is produced by molding the polyamide resin composition of the disclosure.

A timing chain component or a timing belt component of the disclosure is produced by molding the polyamide resin composition of the disclosure.

The polyamide resin composition of the present disclosure has liquidity, as well as superior mechanical strength and creep characteristics, and thus can be suitably used to form thin automobile parts, and the like, which are required to have low warpage, and to be highly reliable for long-term use.

BRIEF DESCRIPTION OF THE DRAWINGS

FIG. 1 is a schematic perspective view of a cylinder head cover, and

FIG. 2 is a schematic view of a cut area for a bend creep test.

DESCRIPTION OF EMBODIMENTS

Figure 1:
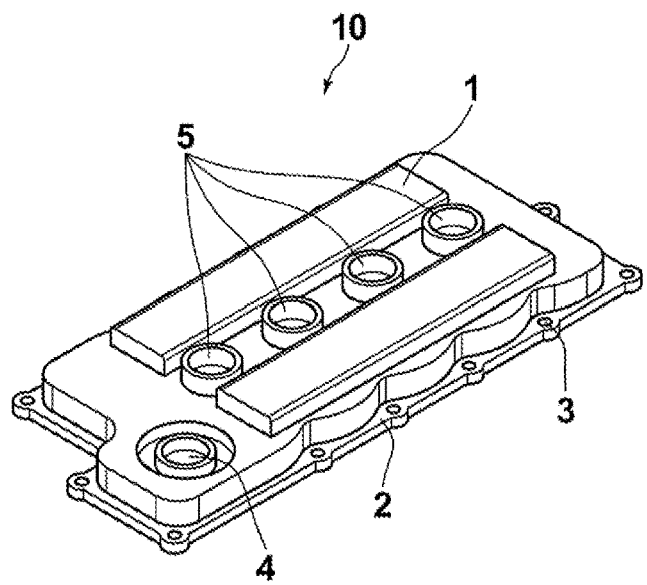
[FIG. 1]

Hereinafter, specific description of the present disclosure will be given.
(A) Polyamide Resin Polyamide refers, in general, to a polymer having an amide bond (—CO—NH—) as a repeat unit in a molecule. Polyamide 66 is a polyamide that is obtained by polycondensation of hexamethylene diamine and adipic acid. Because of its superior heat resistance, mechanical strength, and creep characteristics, the polyamide 66 is used to form functional parts of automobiles, machines, and electric appliances. An (A) polyamide resin of the disclosure contains the polyamide 66 (polyhexamethylene adipamide) in amount of 90 mass % or more relative to 100 mass % of the polyamide resin. Containing the polyamide 66 in amount of 90 mass % or more allows ensuring mechanical strength and creep strength while controlling the solidifying point.

As the (A) polyamide resin, a copolymer of the polyamide 66 and a forming monomer other than the polyamide 66, or a blend of the polyamide 66 and another polyamide may be used, provided that the content of the polyamide is less than 10 mass % and the solidifying point of the polyamide resin composition is not less than 210° C. Examples of such a copolymer and a blend may include copolymers or blends with polyamide 4 (poly-α-pyrrolidone), polyamide 6 (polycaproamide), polyamide 11 (polyundecaneamide), polyamide 12 (polydodecaneamide), polyamide 46 (polytetramethylene adipamide), polyamide 56 (polypentamethylene adipamide), polyamide 410 (polytetramethylene sebacamide), polyamide 412 (polytetramethylene dodecanamide), polyamide 610 (polyhexamethylene sebacamide), polyamide 612 (polyhexamethylene dodecanamide), polyamide 1010 (polydecamethylene sebacamide), polyamide 1012 (polydecamethylene dodecanamide), polyamide 6T (polyhexamethylene terephthalamide), polyamide 9T (polynonane methylene terephthalamide), polyamide 6I (polyhexamethylene isophthalamide), and the like.

At the terminal groups of the polyamide resin, in general, amino groups or carboxyl groups are present. Without limiting the disclosure, the ratio of the amount of amino terminal groups relative to the total of the amount of amino terminal groups and the amount of carboxyl terminal groups of the (A) polyamide resin used in the disclosure (i.e., the amount of amino terminal groups/(the amount of amino terminal groups+the amount of carboxyl terminal groups)) is preferably 0.3 or more and less than 1.0, more preferably 0.3 or more and 0.8 or less, and even more preferably 0.3 or more and 0.6 or less. Molded articles obtained from the polyamide resin composition with the amounts of the terminal groups within the above range tend to have more superior color tone, mechanical strength, and vibration fatigue resistance.

The amount of amino terminal groups of the polyamide resin is preferably in the range from 10 to 100 μmol/g, more preferably in the range from 15 to 80 μmol/g, and even more preferably in the range from 30 to 80 μmol/g. The polyamide resin composition having the amount of amino terminal groups within the above range tends to have more superior mechanical strength.

The amount of amino terminal groups and the amount of carboxyl terminal groups can be measured, for example, by a $^1$H-NMR method or a titration method. In the $^1$H-NMR method, the amounts of the terminal groups can be found based on a value of the integral of characteristic signals corresponding the respective terminal groups. In the titration method, the amount of amino terminal groups can be found, for example, by titrating a phenol solution of the polyamide resin with 0.1N hydrochloric acid, and the amount of carboxyl terminal groups can be found, for example, by titrating a benzyl alcohol solution of the polyamide resin with 0.1N sodium hydroxide.

Concentration of the terminal groups of the polyamide resin can be controlled using known methods. An example of the controlling method is, but is not particularly limited to, using a terminal controlling agent. As a specific example, one or more terminal controlling agents selected from the group consisting of a monoamine compound, a diamine compound, a monocarboxylic acid compound, and a dicarboxylic acid compound may be added during polymerization of the polyamide such that a predetermined terminal concentration is achieved. The timing to add the terminal controlling agent to a solvent is not particularly limited as long as the terminal controlling agent works properly, and the terminal controlling agent may be added, for example, when the above-described raw materials of the polyamide are added to the solvent.

Examples of the above-mentioned monoamine compound include, but are not particularly limited to: aliphatic monoamines, such as methylamine, ethylamine, propylamine, butylamine, hexylamine, octylamine, decylamine, stearylamine, dimethylamine, diethylamine, dipropylamine, and dibutylamine; alicyclic monoamines, such as cyclohexylamine and dicyclohexylamine; aromatic monoamines, such as aniline, toluidine, diphenylamine, and naphtylamine; and any mixture thereof. Among them, butylamine, hexylamine, octylamine, decylamine, stearylamine, cyclohexylamine, and aniline are preferred in view of reactivity, boiling point, stability of blocked terminal, cost, etc. These monoamine compounds may be used alone or in combination of two or more.

Examples of the above-mentioned diamine compound include, but are not particularly limited to, linear aliphatic diamines, such as hexamethylene diamine and pentamethylene diamine; branched aliphatic diamines, such as 2-methylpentane diamine and 2-ethylhexamethylene diamine; aromatic diamines, such as p-phenylene diamine and m-phenylene diamine; and alicyclic diamines, such as cyclohexane diamine, cyclopentane diamine and cyclooctane diamine. These diamine compounds may be used alone or in combination of two or more.

Examples of the above-mentioned monocarboxylic acid compound include, but are not particularly limited to: aliphatic monocarboxylic acids, such as acetic acid, propionic acid, butyric acid, valeric acid, caproic acid, caprylic acid, lauric acid, tridecyl acid, myristic acid, palmitic acid, stearic acid, pivalic acid, and isobutylic acid; alicyclic monocarboxylic acids, such as cyclohexane carboxylic acid; and aromatic monocarboxylic acids, such as benzoic acid, toluic acid, α-naphthalene carboxylic acid, β-naphthalene carboxylic acid, methylnaphthalene carboxylic acid, and phenylacetic acid. In this embodiment, these carboxylic acid compounds may be used alone or in combination of two or more.

Examples of the above-mentioned dicarboxylic acid compound include, but are not particularly limited to units derived from: aliphatic dicarboxylic acids, such as malonic acid, dimethyl malonic acid, succinic acid, glutaric acid, adipic acid, 2-methyl adipic acid, trimethyl adipic acid, pimelic acid, 2,2-dimethyl glutaric acid, 3,3-diethyl succinic acid, azelaic acid, sebacic acid, and suberic acid; alicyclic dicarboxylic acids, such as 1,3-cyclopentane dicarboxylic acid and 1,4-cyclohexane dicarboxylic acid; and aromatic dicarboxylic acids, such as isophthalic acid, 2,6-naphthalene dicarboxylic acid, 2,7-naphthalene dicarboxylic acid, 1,4-naphthalene dicarboxylic acid, 1,4-phenylene dioxydiacetate, 1,3-phenylene dioxydiacetate, diphenic acid, diphenylmethane-4,4'-dicarboxylic acid, diphenyl sulfone-4,4'-dicarboxylic acid, and 4,4'-biphenyl dicarboxylic acid. These dicarboxylic acids may be used alone or in combination of two or more.

It is preferred that the (A) polyamide resin contain a liquidity improver. When the liquidity improver is contained, a spiral flow value and a formic acid relative viscosity VR within desired ranges can be achieved, and this allows achieving superior liquidity, appearance, and plasticity.

Specific examples of the liquidity improver may include STRUKTOL TR-063A (available from Struktol of America), and LIONON DEH-40 (available from Lion Corporation), which is a fatty acid diester, etc.

These liquidity improvers may be used alone or in combination of two or more.

In view of liquidity, appearance, and plasticity, the liquidity improver used in the disclosure may be added in an amount in the range from 0.1 to 10 mass %, more preferably in the range from 0.3 to 5 mass %, even more preferably in the range from 0.3 to 3 mass %, and particularly preferably in the range from 0.3 to 2.5 mass % relative to 100 mass % of the polyamide resin composition, although it depends on the type of the liquidity improver used.

Formic Acid Relative Viscosity VR

The formic acid relative viscosity VR can be found according to the measurement method shown in Examples, where the polyamide resin composition is added to formic acid, and a viscosity of the solubles is compared with the viscosity of formic acid. The formic acid relative viscosity (VR) is in the range of $30<VR<40$, and preferably $32<VR<38$. The VR less than 40 allows ensuring liquidity, thereby allowing making thin molded products. Further, the VR greater than 30 allows stabilizing measuring time and keeping the resin from unintendedly flowing out of the nozzle during molding, significantly improving mechanical strength, and eliminating causes of gas formation and mold deposit due to decrease of thermal stability.

In view of liquidity and mechanical strength, the content of the (A) polyamide resin of the disclosure may be 30 mass % or more and less than 70 mass %, more preferably 40 mass % or more and less than 70 mass %, and even more preferably 50 mass % or more and less than 70 mass % relative to 100 mass % of the polyamide resin composition.

(B) Inorganic Filler

The polyamide resin composition of the disclosure contains a (B) inorganic filler. The polyamide resin composition containing the inorganic filler can achieve superior mechanical strength and rigidity.

Examples of the inorganic filler include, but are not limited to: glass fiber, carbon fiber, calcium silicate fiber, potassium titanate, aluminum borate, glass flakes, glass beads, talc, kaolin, mica, hydrotalcite, calcium carbonate, zinc carbonate, zinc oxide, calcium monohydrogen phosphate, wollastonite, silica, zeolite, alimina, boehmite, aluminum hydroxide, titanium oxide, silicon oxide, magnesium oxide, calcium silicate, sodium aluminosilicate, magnesium silicate, KETJENBLACK, acetylene black, furnace black, carbon nanotube, graphite, brass, copper, silver, aluminum, nickel, iron, calcium fluoride, mica, montmorillonite, swellable fluorine mica, and apatite.

These inorganic fillers may be used alone or in combination of two or more.

Among them, in view of increasing mechanical strength and rigidity of the polyamide resin composition of the disclosure, one or more selected from the group consisting of glass fiber, carbon fiber, glass flakes, glass beads, talc, kaolin, mica, calcium carbonate, calcium monohydrogen phosphate, wollastonite, silica, carbon nanotube, graphite, calcium fluoride, montmorillonite, potassium titanate, swellable fluorine mica, and apatite are preferred, one or more selected from the group consisting of glass fiber, carbon fiber, glass flakes, glass beads, wollastonite, talc, mica, kaolin, calcium carbonate, and potassium titanate are more preferred, and glass fiber is particularly preferred.

With respect to the above-mentioned glass fiber and the carbon fiber, those having a number-average fiber minor diameter in the range from 3 to 30 μm, a weight-average fiber length in the range from 100 to 750 μm, and an aspect ratio between the weight-average fiber length and the number-average fiber minor diameter (i.e., a value of the weight-average fiber length divided by the number-average fiber minor diameter) in the range from 10 to 100 in the polyamide resin composition are even more preferred, in view of imparting superior mechanical properties to the polyamide resin composition.

Further, the glass fiber and the carbon fiber may have a circular or oblate (such as elliptical or cocoon-like) cross-section. The glass fiber and the carbon fiber having an oblate cross-section are preferable in view of low warpage.

When the glass fiber has an oblate cross-section, the glass fiber preferably has a number-average fiber minor diameter (which may also be referred to as "average minor diameter") in the range from 3 to 15 µm, more preferably in the range from 4 to 12 µm, and even more preferably in the range from 5 to 11 µm, in view of superior mechanical strength and appearance, and low warpage.

Further, with respect to the above-mentioned wollastonite, those having a number-average fiber minor diameter in the range from 3 to 30 µm, a weight-average fiber length in the range from 10 to 500 µm, and an aspect ratio in the range from 3 to 100 in the polyamide resin composition are even more preferred in view of imparting superior mechanical properties to the polyamide resin composition.

Further, with respect to the above-mentioned talc, mica, kaolin, and silicon nitride, those having a number-average particle diameter in the range from 0.1 to 10 µm in the polyamide resin composition are even more preferred in view of imparting superior mechanical properties to the polyamide resin composition.

The number-average fiber minor diameter, the number-average particle diameter, and the weight-average fiber length can be measured according to the following method.

The polyamide resin composition is placed in an electric furnace to burn off organic materials contained in the polyamide resin composition. Then, 100 or more fibers of the inorganic filler are arbitrarily selected from the residue and observed with a SEM (Scanning Electron Microscope) or microscope to measure the fiber minor diameter and the particle diameter of each fiber of the inorganic filler to calculate the number-average fiber minor diameter and the number-average particle diameter. At the same time, the weight-average fiber length can be found by measuring the length of each fiber using a SEM or microscopic image at a magnification of 1000×.

More specifically, about 1 g of the polyamide resin composition is measured and placed in a crucible of the electric furnace to be burned at 650° C. for 4 hours, and then is cooled. Thereafter, the remaining fibers are put on a glass plate to measure the number-average fiber minor diameter, the number-average particle diameter, and the weight-average fiber length of arbitrarily selected fibers of the inorganic filler using a microscope (a digital microscope VHX-5000, available from Keyence, at a magnification of 1000×).

The (B) inorganic filler may be surface-treated with a silane coupling agent, or the like.

Examples of the silane coupling agent include, but are not limited to: amino silanes, such as γ-aminopropyl triethoxysilane, y-aminopropyl trimethoxysilane, and N-β-(aminoethyl)-γ-aminopropyl methyldimethoxysilane; mercapto silanes, such as γ-mercapto propyl trimethoxysilane and γ-mercaptopropyl triethoxysilane; epoxy silanes, such as novolac epoxy silane; and vinyl silanes.

In particular, one or more selected from the above-listed silanes are preferred, and amino silanes are more preferred in view of improving mechanical strength based on wettability with a polyamide.

Further, with respect to the glass fiber and the carbon fiber, a binder may further be contained. Examples of the binder may include: an acid copolymer that contains, as structural units, a carboxylic acid anhydrate-containing unsaturated vinyl monomer and an unsaturated vinyl monomer other than a carboxylic acid anhydrate-containing unsaturated vinyl monomer; an epoxy compound; a polycarbodiimide compound; a polyurethane resin; a homopolymer of an acrylic acid; and a copolymer of an acrylic acid and any other copolymerizable monomer; as well as a salt of any of them with primary, secondary, and tertiary amines. These binders may be used alone or in combination of two or more. Containing the above-mentioned acid copolymer as the binder is preferred in view of further improving creep strength.

The glass fiber and the carbon fiber are obtained through a continuous reaction in known processes for producing glass fiber and carbon fiber.

Specifically, the glass fiber and the carbon fiber are obtained by making fiber strands by applying the binder to glass fiber and carbon fiber using a known means, such as a roller-type applicator, and drying them.

The fiber strands may be used in the form of roving strands as produced, or may be cut into chopped glass strands before use.

The amount of the binder added to the glass fiber or the carbon fiber is preferably in the range from 0.2 to 3 mass %, and more preferably in the range from 0.3 to 2 mass %, in solid ratio relative to 100 mass % of the glass fiber or the carbon fiber.

In view of keeping the glass fiber and the carbon fiber in a bounded state, the amount of the binder added to the glass fiber or the carbon fiber is preferably equivalent to 0.2 mass % or more in solid ratio relative to 100 mass % of the glass fiber or the carbon fiber. On the other hand, in view of improving thermal stability of the polyamide resin composition of the disclosure, the amount of the binder is preferably equivalent to 3 mass % or less. Further, the strand drying step may be performed after the cutting step, or the cutting step may be performed after the strand drying step.

In view of mechanical strength and appearance, the amount of the inorganic filler used in the disclosure is 30% or more, preferably in the range from 30 to 70 mass %, more preferably in the range from 30 to 65%, and even more preferably in the range from 30 to 60% relative to 100 mass % of the polyamide resin composition.

(D) Lubricant

The polyamide resin composition of the disclosure may contain a (D) lubricant in view of further improving liquidity and appearance.

Examples of the lubricant include, but are not particularly limited to, fatty acid metal salts, fatty acid esters, fatty acid amides, polyethylene wax, etc. In view of superior appearance and moldability, using one or more selected from fatty acid metal salts, fatty acid esters, and fatty acid amides is preferred, using two or more of them in combination is more preferred, and using a fatty acid metal salt and a fatty acid ester in combination is even more preferred.

The fatty acid refers to an aliphatic monocarboxylic acid. In particular, a fatty acid having a carbon number of 8 or more is preferred, and a fatty acid having a carbon number of 8 to 40 is more preferred.

Examples of the fatty acid include, but are not limited to, saturated or unsaturated linear or branched aliphatic monocarboxylic acids, such as stearic acid, palmitic acid, behenic acid, erucic acid, oleic acid, lauric acid, montanic acid, etc.

The fatty acid ester refers to an ester compound of the above-described fatty acid and an alcohol.

Examples of the alcohol include 1,3-butanediol, trimethylolpropane, stearyl alcohol, behenyl alcohol, lauryl alcohol, etc.

Examples of the fatty acid ester include stearyl stearate, behenyl behenate, montanic acid-1,3-butanediol ester, montanic acid-trimethylolpropane ester, trimethylolpropane trilaurate, butyl stearate, etc.

The fatty acid amide refers to an amidified product of the above-described fatty acid.

Examples of the fatty acid amide include stearic acid amide, oleic acid amide, erucamide, ethylene bisstearylamide, ethylene bisoleylamide, N-stearylstearylamide, N-stearyl erucamide, etc. Among them, stearic acid amide, erucamide, ethylene bisstearylamide, and N-stearyl erucamide are preferred, and ethylene bisstearylamide and N-stearyl erucamide are more preferred.

The fatty acid metal salt refers to a metal salt of the above-described fatty acid.

Examples of a metal element forming the fatty acid and the salt thereof include Family I elements (alkali metals), Family II elements (alkaline-earth metals), and Family III elements in the periodic table of elements, as well as zinc, aluminum, etc.

Elements preferred as the metal element are: alkali metals, such as sodium and potassium; alkaline-earth metals, such as calcium and magnesium; and aluminum.

Examples of the fatty acid metal salt include, but are not limited to, calcium stearate, aluminum stearate, zinc stearate, magnesium stearate, calcium montanate, sodium montanate, aluminum montanate, zinc montanate, magnesium montanate, calcium behenate, sodium behenate, zinc behenate, calcium laurate, zinc laurate, calcium palmitate, etc.

The amount of the lubricant to be added is not particularly limited; however, in view of achieving superior appearance and moldability, and ensuring mechanical strength, the amount of the lubricant to be added is preferably in the range from 0.05 to 1.5 mass %, more preferably in the range from 0.05 to 1 mass %, and even more preferably in the range from 0.08 to 0.6 mass % relative to 100 mass % of the polyamide resin composition.

The polyamide resin composition of the disclosure can contain any additives besides those described above. For example, an anti-oxidant, a UV absorber, a thermal stabilizer, an anti-photodegradation agent, a plasticizer, a releasing agent, a core former, a flame retardant, a colorant, etc., can be added, and any other thermoplastic resin may be blended.

The colorant is not particularly limited, and examples thereof include carbon black, titanium oxide, azine series dye, etc. The amount of the colorant to be added is not particularly limited; however, in view of superior appearance and moldability, the amount of the colorant to be added is preferably in the range from 0.01 to 3 mass %, more preferably in the range from 0.05 to 2 mass %, and even more preferably in the range from 0.1 to 2 mass %.

Physical Properties of Polyamide Resin Composition

Solidifying Point

The polyamide resin composition of the disclosure has a solidifying point of 210° C. or more, preferably 210° C. or more and 230° C. or less, more preferably 213° C. or more and 225° C. or less, and even more preferably 215° C. or more and 220° C. or less.

The solidifying point can be measured according to the method described in the Examples.

The polyamide resin composition having the solidifying point within the above-defined range can be molded with sufficiently long gate seal time, and this allows molding micro-parts, such as thin molded parts, to be free of appearance defects due to insufficient packing and/or insufficient binding of the filler.

An example method for controlling the solidifying point to be within the above-defined range is controlling the ratio of the polyamide 66 in the (A) polyamide resin by adding polyamide 6, a branched component, or an azine series dye having a low solidifying point.

Further, another example method for controlling the solidifying point is increasing the ratio of the polyamide 66 in the polyamide resin.

Spiral Flow Value

The spiral flow value (SFD) of the polyamide resin composition is a spiral flow value in a flat spiral mold having a cavity width of 10 mm and a thickness of 2 mm, and is 60 cm or more under the conditions of a set temperature of 285° C., a mold temperature of 80° C., and an injection pressure of 70 MPa when the content of the (B) inorganic filler is 30 mass % or more and less than 40 mass %. When the content of the inorganic filler is 40 mass % or more and less than 50 mass %, the spiral flow value is 40 cm or more under the conditions of a set temperature of 285° C., a mold temperature of 80° C., and an injection pressure of 70 MPa. When the content of the inorganic filler is 50 mass % or more and 70 mass % or less, the spiral flow value is 20 cm or more under the conditions of a set temperature 295° C., a mold temperature of 80° C., and an injection pressure of 70 MPa.

The SFD can be controlled to be within the above range by, for example, controlling the formulating ratio of the polyamide 66 in the (A) polyamide resin to be within the above-defined range, or adding the above-described liquidity improver or lubricant.

Strain in Tensile Creep Test

The polyamide resin composition has a strain of 3.8% or less, preferably 3.5% or less, and even more preferably 3.3% or less in a 1000-hour tensile creep test under the conditions of 120° C. and 60 MPa. The polyamide resin composition having a strain of 3.8% or less can be suitably used as a material for forming a part in an engine room, such as a cylinder head cover, a torque rod, or an engine mount, which is fastened with bolts and experiences vibration at high temperatures for long time during use, and is required to have high creep characteristics.

The strain in the tensile creep test can be measured according to the method described in the Examples.

The strain in the tensile creep test can be controlled to be within the above-defined range by, for example, controlling the formulating ratio of the polyamide 66 in the (A) polyamide resin to be within the above-defined range.

Tensile Strength

It is preferred that the polyamide resin composition of the disclosure have a tensile strength, which is measured according to ISO 527, as described in the Examples, of greater than 195 MPa when the content of the (B) inorganic filler is 30 mass % or more and less than 40 mass %, greater than 240 MPa when the content of the (B) inorganic filler is 40 mass % or more and 50 mass % or less, and greater than 250 MPa when the content of the (B) inorganic filler is greater than 50 mass % and 70 mass % or less. The tensile strength of the polyamide resin can be controlled to be within the above-defined range by, for example, but not particularly limited to, controlling the formulating ratio of the polyamide 66 in the (A) polyamide resin to be 90 mass % or more relative to 100 mass % of the polyamide resin, or using glass fiber as the (B) inorganic filler, or using an amino silane series compound as the coupling agent in combination with the (B) inorganic filler.

Method of Producing Polyamide Resin Composition

The polyamide resin composition of the disclosure can be produced by kneading the (A) polyamide resin in a melt state using a single-axis or multi-axis extruder. In the case where the (B) inorganic filler, in particular, chopped strand glass fiber is used, a method using a two-axis extruder including an upstream feed port and a downstream feed port can be preferably used, such that the polyamide resin is fed through the upstream feed port and is melt, and then, the chopped strand glass fiber is fed through the downstream feed port and is melt and kneaded. Alternatively, in the case where glass fiber roving strand is used as the (B) inorganic filler, the glass fiber roving strand can be combined using a known method.

The thus obtained composition can be molded using various conventionally-known methods, such as injection molding, into molded articles that form various parts.

These various parts can suitably be used for, for example, automobiles, mechanical engineering, electric and electronic devices, industrial materials, engineering materials, and articles for daily and home use. In particular, the polyamide resin composition of the disclosure, which has good liquidity, superior mechanical strength, and high creep characteristics, can be suitably used as a material forming, for example, a cylinder head cover and an oil pan having an average product thickness of 2 mm or less, which are required to have oil leak resistance, and various parts in an engine room of automobiles; a head rest component, which is required to have deformation resistance to serve as a guard against whiplash symptoms in case of a car-to-car rear crash; an engine mount and a torque rod, which are required to have superior creep characteristics and vibration fatigue characteristics to endure vibration from the engine; a resonator, which is required to have thermal deformation resistance and creep deformation resistance to decrease sound pressure at a resonant frequency that exerts adverse effect to a human body during driving; and a timing chain component and a timing belt component, which are required to have creep deformation resistance to hold a chain in a precise position at a precise pressure.

EXAMPLES

Hereinafter, the present disclosure is described in further detail with reference to examples and comparative examples, which are not intended to limit the disclosure.

Taw Materials Used
(1)(A) Polyamide Resin
1-1: polyamide 66 having a formic acid relative viscosity VR of 44
1-2: polyamide 66 having a formic acid relative viscosity VR of 35
1-3: polyamide 66 having a formic acid relative viscosity VR of 22
1-4: polyamide 6 having a formic acid relative viscosity VR of 45
(2)(B) Inorganic Filler
2-1: glass fiber (GF) having a fiber average minor diameter of 10 μm and a fiber average length of 3 mm in combination with a binder mainly composed of butadiene-maleic anhydride copolymer and treated with N-β(aminoethyl) γ-aminopropyl triethoxysilane
2-2: glass fiber having a fiber average minor diameter of 13 μm and a fiber average length of 3 mm in combination with a binder mainly composed of butadiene-maleic anhydride copolymer and treated with N-β(aminoethyl)γ-aminopropyl triethoxysilane
2-3: glass fiber having a fiber average minor diameter of 10 μm and a fiber average length of 3 mm in combination with a binder mainly composed of urethane resin and treated with N-β(aminoethyl)γ-aminopropyl triethoxysilane
2-4: glass fiber having a fiber average minor diameter of 13 μm and a fiber average length of 3 mm in combination with a binder mainly composed of urethane resin and treated with N-β(aminoethyl)γ-aminopropyl triethoxysilane
2-5: glass fiber having a fiber average minor diameter of 10 μm and a fiber average length of 3 mm in combination with a binder mainly composed of butadiene-maleic anhydride copolymer and treated with novolac epoxy silane
2-6: glass fiber having a fiber average minor diameter of 13 μm and a fiber average length of 3 mm in combination with a binder mainly composed of butadiene-maleic anhydride copolymer and treated with novolac epoxy silane
2-7: wollastonite treated with amino silane
(3) Liquidity Improver
STRUKTOL TR-063A (available from Struktol of America)
LIONON DEH-40 (available from Lion Corporation)
Zinc oxide: zinc oxide (Type 1) available from Sakai Chemical Industry Co., Ltd.
(4) Lubricant
Calcium stearate having an acid value of 0.02 mgKOH/g and including 0.01% of free fatty acid
Measurement of Physical Properties
Methods used to measure the physical properties are described.
Solidifying Point
The solidifying point (Tc) of each polyamide resin composition obtained in examples and comparative examples was measured by cutting out samples having a weigh of about 10 mg and using DIAMOND-DSC available from Perkin-Elmer.
Measurement conditions were as follows:
1) 50° C. to 300° C. at a rate of 200° C./minute, and kept at 300° C. for three minutes,
2) 300° C. to 50° C. at a rate of 20° C./minute, and kept at 50° C. for three minutes,
3) 50° C. to 300° C. at a rate of 20° C./minute, and kept at 300° C. for three minutes, and
4) 300° C. to 50° C. at a rate of 20° C./minute.

Using the above conditions, the cut samples were uniformly melt in a measuring pan with the condition 1), the melt resin was uniformly solidified with the condition 2), the resin was uniformly melt again with the condition 3), and the peak temperature when the resin was solidified with the condition 4) was determined as the solidifying point. The peak temperature found with the condition 4) rather than the condition 2) is used as the solidifying point, since the solidifying point may shift if the temperature is not uniformly conducted in the measuring pan.

SFD
Each polyamide resin composition was injection molded under the following conditions to measure the spiral flow value.
For the polyamide resin compositions containing 35 mass % of glass fiber and the polyamide resin composition containing 50 mass % of glass fiber:
injection molder: SE-130D available from Sumitomo Heavy Industries, Ltd.,
mold for measurement: a spiral mold having a mold inner groove width (cavity) of 10 mm×a thickness of 2 mm,
mold temperature: 80° C.,
set temperature: 285° C.,
injection pressure: 70 MPa (the injection speed was set at the MAX, and the pressure was controlled),
injection time: 10 seconds, and
cooling time: 15 seconds.

For the polyamide resin compositions containing 60 mass % of glass fiber:
 injection molder: SE-130D available from Sumitomo Heavy Industries, Ltd.,
 mold for measurement: a spiral mold having a mold inner groove width (cavity) of 10 mm×a thickness of 2 mm,
  mold temperature: 80° C.,
  set temperature: 295° C.,
  injection pressure: 70 MPa (the injection speed was set at the MAX, and the pressure was controlled),
  injection time: 10 seconds, and
  cooling time: 15 seconds.
Formic Acid Relative Viscosity VR The formic acid relative viscosity (VR) was found by comparing the viscosity of a solution (solubles) of each polyamide resin composition obtained in examples and comparative examples added to formic acid with the viscosity of formic acid. Specifically, the VR was measured according to ASTM-D789. More specifically, the VR was measured at 25° C. using a solution prepared by dissolving the polyamide resin in 90 mass % of formic acid (and 10 mass % of water) such that the content of the polyamide resin was 8.4 mass %.

Tensile Creep Test

A 4 mm-thick dumbbell test piece, as defined in ISO294-1, was made using an injection molder, and the measurement was conducted under the following conditions. Molding conditions:
 injection molder: SE-50D available from Sumitomo Heavy Industries, Ltd.,
 mold for measurement: a 4 mm-thick ISO dumbbell test piece mold (according to ISO294-1),
  mold temperature: 80° C.,
  cylinder temperature: 275° C.,
  injection speed: 100 mm/sec (the injection speed was controlled),
  injection time: 1 second, and
  cooling time: 14 seconds.
Creep test conditions:
  oven temperature: 120° C., and
  load: 60 MPa.

After 1000 hours, the elongation change of the dumbbell test piece was measured, and the strain was calculated according to the equation below:

Strain (%)=((Dumbbell test piece length after test−Dumbbell test piece length before test)/Dumbbell test piece length before test)×100.

Tensile Strength (TS)

Similarly to the tensile creep test, a 4 mm-thick dumbbell test piece that was made under the conditions defined in ISO294-1 was used to conduct a tensile test according to ISO527 with a tensile speed of 5 mm/minute to measure the tensile strength.

Evaluation Method

Evaluation methods are described below.

Warpage Test

Molding conditions:
 injection molder: SE-50D available from Sumitomo Heavy Industries, Ltd.,
 mold for measurement: a 60 mm 2 mm-thick flat plate test piece mold (side gate) (according to ISO294-1),
  mold temperature: 80° C.,
  cylinder temperature: 275° C.,
  injection speed: 50 mm/sec (the injection speed was controlled),
  injection time: 1 second, and
  cooling time: 15 seconds.

The resulting test pieces were stored for 24 hours at 23° C. and 50% RH, and then, corners of each sample on the gate side were secured on a stone surface plate under the same temperature and humidity conditions to measure the maximum height of the sample as the amount of warpage.
 A: 0 mm≤amount of warpage≤3.0 mm
 B: 3 mm<amount of warpage≤4 mm
 C: 4 mm<amount of warpage Oil Leak Test A cylinder head cover, as shown in FIG. 1, was molded under the same molding conditions as those in the above-described warpage test. The cylinder head cover 10 shown in FIG. 1 has spark plug insertion holes 5 between two cylinder head cover top portions 1, bolt insertion holes 3 in a flange portion 2, and an oil filler cap mounting hole 4 on a side of the cylinder head cover top portion 1 positioned near the front side in the view shown in the drawing. It should be noted that a collar member (not shown) made of a metal is fitted in each bolt insertion holes 3.

A gasket was fitted in a gasket groove of each bolt insertion hole 3 of the cylinder head cover, and the cylinder head cover was assembled onto a 30 mm-thick steel plate jig with bolts (the bolts were fastened at 14 positions with a fastening torque of 10N·m).

Through the oil filler cap mounting hole 4 of the cylinder head cover assembled onto the steel plate jig, two liters of engine oil was poured and the mounting hole 4 was sealed with a curing resin.

This assembly was left for 24 hours in a room at 23° C. and 50% RH, and then, whether there were oil leaks was visually checked and evaluated according to the criteria shown below.

Subsequently, the assembly was placed in an air oven at 120° C., and removed therefrom after 1000 hours. Then, whether there were oil leaks was visually checked and evaluated according to the criteria shown below.
 A: no oil leaks were observed
 B: traces of oil were observed around the gaskets
 C: oil leaks were clearly observed Vibration Fatigue Test An ASTM D1822 TYPE S test piece was molded at a cylinder temperature of 295° C. and a mold temperature of 80° C., and a vibration fatigue test was conducted under the following conditions:
 testing machine: Shimadzu SERVO PULSER-EHF-EV011K2-020-1A,
 temperature: 120° C.,
 stress ratio: 1.0,
 waveform: sinusoidal wave,
 distance between chucks: 25 mm,
 frequency: 10 Hz (when the content of the filler was 50% or more) and 20 Hz (when the content of the filler was less than 50%), and
 sample shape: ASTM D1822 Type S (3 mm t).

Evaluation criteria were as follows.
 A: 200000 or more vibration cycles before rupture at 80 MPa when the content of the filler B was 50% or more, and 30000 or more vibration cycles before rupture at 80 MPa when the content of the filler B was less than 50%
 B: 100000 or more and less than 200000 vibration cycles before rupture at 80 MPa when the content of the filler B was 50% or more, and 10000 or more and less than 30000 vibration cycles before rupture at 80 MPa when the content of the filler B was less than 50%
 C: less than 100000 vibration cycles before rupture at 80 MPa when the content of the filler B was 50% or more, and less than 10000 vibration cycles before rupture at 80 MPa when the content of the filler B was less than 50%

Bend Creep Test

Figure 2:
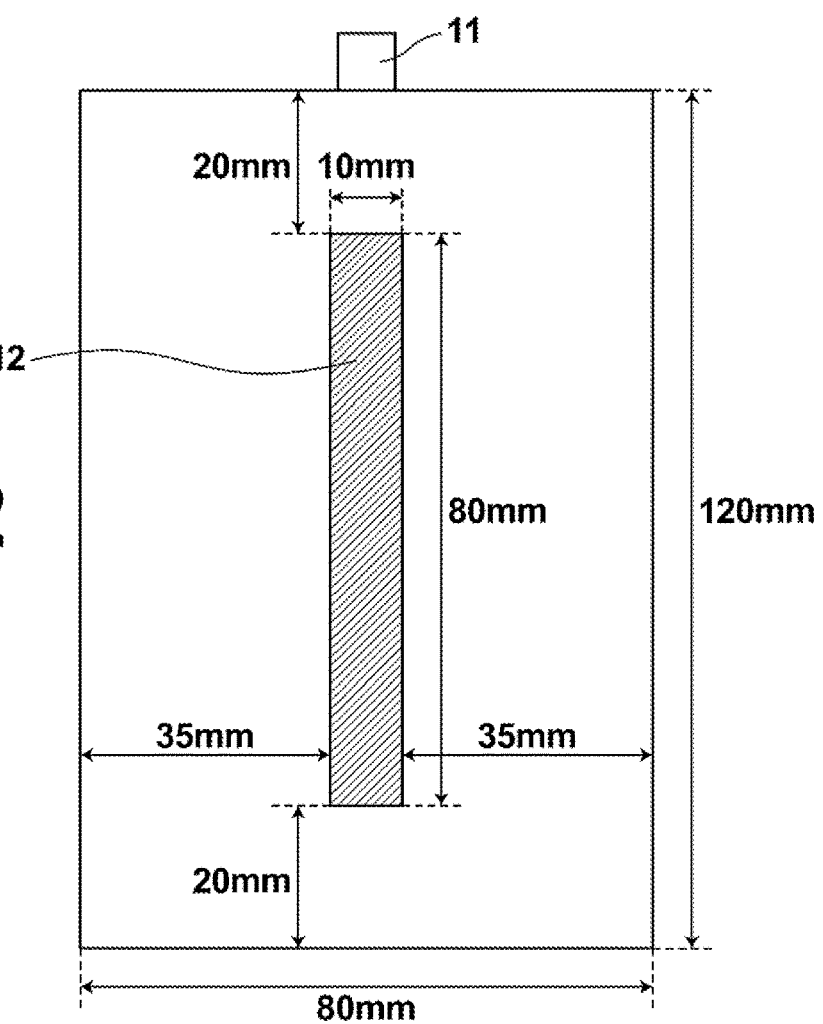
[FIG. 2]

A 80 mm×120 mm×2 mm side gate flat plate was molded at a cylinder temperature of 285° C. and a mold temperature of 80° C. when the GF content was less than 50%, and at a cylinder temperature of 295° C. and a mold temperature of 80° C. when the GF content was 50% or more. Then, a cut area 12, as shown in FIG. 2, was cut with a precision cutting saw to provide a size of 10 mm×80 mm, and the amount of bend deformation at 40 MPa and 23° C. was measured using a creep testing machine.

Creep testing machine: CP6-L-250 available from A&D Company, Limited

Conditions: 23° C., 1000 hours

Evaluation criteria were as follows.

A: deformation strain after 1000 hours was not greater than 0.8%

B: deformation strain after 1000 hours was greater than 0.8% and not greater than 1.0%

C: deformation strain after 1000 hours was greater than 1.0%

Examples 1 to 11, Comparative Examples 1 to 16

A two-axis extruder (ZSK-26MC: available from Coperion (Germany)), having an upstream feed port at the first barrel from the upstream side of the extruder, a downstream feed port at the ninth barrel from the upstream side of the extruder, and a vacuum degassing port at the eleventh barrel from the upstream side of the extruder, and having an L/D (extruder cylinder length/extruder cylinder diameter)=48 (the number of barrels was 12) was used. Setting the temperature of the area from the upstream feed port to the die at 310° C., and under the conditions of a screw rotation speed of 300 rpm and an ejection rate of 25 kg/h, the polyamide and the liquidity improver or lubricant were fed through the upstream feed port and the glass fiber was fed through the downstream feed port to achieve the respective ratios shown in Tables 1 and 2, and were melt and kneaded while the pressure was reduced via the vacuum degassing port, to prepare resin composition pellets. The thus obtained resin composition pellets were molded under the above-described molding conditions, and evaluated in the warpage test and the oil leak test. Physical property values and the results of evaluation are shown in Tables 1 and 2 along with the respective compositions.

TABLE 1

|  |  | Example 1 | Example 2 | Example 3 | Example 4 | Example 5 | Example 6 |
|---|---|---|---|---|---|---|---|
| Polyamide 66 | VR: 44 |  |  |  |  | 65 |  |
| Polyamide 66 | VR: 35 | 65 | 65 | 65 | 65 | — | 65 |
| Polyamide 66 | VR: 22 |  |  |  |  |  |  |
| Polyamide 6 |  |  |  |  |  |  |  |
| Inorganic filler | GF: fiber minor diameter 10 μm, binder: acid copolymer, treated with amino silane |  |  | 35 | 35 | 35 | 35 |
|  | GF: fiber minor diameter 10 μm, binder: urethane resin, treated with amino silane |  | 35 |  |  |  |  |
|  | GF: fiber minor diameter 10 μm, binder: acid copolymer, treated with epoxy silane | 35 |  |  |  |  |  |
|  | GF: fiber minor diameter 13 μm, binder: acid copolymer, treated with epoxy silane |  |  |  |  |  |  |
|  | wollastonite, treated with amino silane |  |  |  |  |  |  |
| Liquidity improver | STRUKTOL TR-063A | 1 | 1 | 0.75 | 1 | 2 |  |
|  | LIONON |  |  |  |  |  | 3.5 |
|  | ZnO |  |  |  |  |  |  |
| Lubricant | calcium stearate |  |  |  |  |  |  |
| Solidifying point | Tc | 216 | 216 | 216 | 217 | 217 | 213 |
| Spiral flow value | 285° C., 80° C., 70 MPa | 68 | 67 | 61 | 65 | 66 | 63 |
| SFD | 295° C., 80° C., 70 MPa |  |  |  |  |  |  |
| Creep strain |  | 3 | 3.2 | 2.9 | 3 | 3.2 | 3.4 |
| Formic acid relative viscosity VR |  | 32 | 31 | 33 | 32 | 37 | 35 |
| Tensile strength TS | MPa | 205 | 210 | 211 | 213 | 208 | 205 |
| Warpage test |  | A | A | A | A | A | A |
| Oil leak test | 23° C., 50% RH | A | A | A | A | A | A |
|  | 120° C., 1000 hrs | A | A | A | A | A | A |
| Bend creep test | 23° C., 40 MPa | A | A | A | A | A | A |
| Vibration fatigue test | 120° C., 80 MPa | A | A | A | A | A | A |

|  |  | Example 7 | Example 8 | Example 9 | Example 10 | Example 11 |
|---|---|---|---|---|---|---|
| Polyamide 66 | VR: 44 |  | 50 |  |  |  |
| Polyamide 66 | VR: 35 | 50 |  | 50 | 40 | 40 |
| Polyamide 66 | VR: 22 |  |  |  |  |  |
| Polyamide 6 |  |  |  |  |  |  |
| Inorganic filler | GF: fiber minor diameter 10 μm, binder: acid copolymer, treated with amino silane |  | 50 | 50 |  | 60 |

TABLE 1-continued

|  |  |  |  |  |  |
|---|---|---|---|---|---|
|  | GF: fiber minor diameter 10 μm, binder: urethane resin, treated with amino silane | 50 |  | 60 |  |
|  | GF: fiber minor diameter 10 μm, binder: acid copolymer, treated with epoxy silane |  |  |  |  |
|  | GF: fiber minor diameter 13 μm, binder: acid copolymer, treated with epoxy silane |  |  |  |  |
|  | wollastonite, treated with amino silane |  |  |  |  |
| Liquidity improver | STRUKTOL TR-063A | 0.75 | 0.75 | 0.75 | 0.6 | 0.6 |
|  | LIONON |  |  |  |  |  |
|  | ZnO |  |  |  |  |  |
| Lubricant | calcium stearate |  |  |  |  |  |
| Solidifying point | Tc | 216 | 216 | 216 | 216 | 216 |
| Spiral flow value | 285° C., 80° C., 70 MPa | 49 | 42 | 46 |  |  |
| SFD | 295° C., 80° C., 70 MPa |  |  |  | 28 | 26 |
| Creep strain |  | 3.1 | 2.4 | 2.6 | 2.6 | 2.4 |
| Formic acid relative viscosity VR |  | 32 | 38 | 32 | 31 | 32 |
| Tensile strength TS | MPa | 245 | 250 | 245 | 255 | 257 |
| Warpage test |  | A | A | A | A | A |
| Oil leak test | 23° C., 50% RH | A | A | A | A | A |
|  | 120° C., 1000 hrs | A | A | A | A | A |
| Bend creep test | 23° C., 40 MPa | A | A | A | A | A |
| Vibration fatigue test | 120° C., 80 MPa | A | A | A | A | A |

TABLE 2

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Polyamide 66 | VR: 44 |  |  |  |  |  |  |
| Polyamide 66 | VR: 35 | 65 |  | 65 | 65 | 65 | 65 |
| Polyamide 66 | VR: 22 |  | 65 |  |  |  |  |
| Polyamide 6 |  |  |  |  |  |  |  |
| Inorganic filler | GF: fiber minor diameter 10 μm, binder: acid copolymer, treated with amino silane | 35 | 35 |  |  | 35 | 35 |
|  | GF: fiber minor diameter 10 μm, binder: urethane resin, treated with amino silane |  |  |  |  |  |  |
|  | GF: fiber minor diameter 10 μm, binder: acid copolymer, treated with epoxy silane |  |  |  |  |  |  |
|  | GF: fiber minor diameter 13μm, binder: acid copolymer, treated with epoxy silane |  |  | 35 |  |  |  |
|  | wollastonite, treated with amino silane |  |  |  | 35 |  |  |
| Liquidity improver | STRUKTOLTR-063A |  |  | 1 | 1 | 0.5 | 5 |
|  | LIONON |  |  |  |  |  |  |
|  | ZnO |  |  |  |  |  |  |
| Lubricant | calcium stearate |  |  |  |  |  |  |
| Solidifying point | Tc | 217 | 217 | 217 | 217 | 216 | 215 |
| Spiral flow value | 285° C., 80° C., 70 MPa | 45 | 63 | 65 | 54 | 55 | 66 |
| SFD | 295° C., 80° C., 70 MPa |  |  |  |  |  |  |
| Creep strain |  | 3 | 5.2 | 4.3 | 3.6 | 2.8 | 3.3 |
| Formic acid relative viscosity VR |  | 35 | 22 | 32 | 32 | 34 | 25 |
| Tensile strength TS | MPa | 211 | 180 | 190 | 100 | 210 | 205 |
| Warpage test |  | B | A | A | A | B | un-moldable |
| Oil leak test | 23° C., 50% RH | B | A | A | A | B |  |
|  | 120° C., 1000 hrs | B | C | C | C | B |  |
| Bend creep test | 23° C., 40 MPa | A | C | C | B | A | A |
| Vibration fatigue test | 120° C., 80 MPa | A | C | A | C | A | A |

|  |  | Comp. Ex. 7 | Comp. Ex. 8 | Comp. Ex. 9 | Comp. Ex. 10 |
|---|---|---|---|---|---|
| Polyamide 66 | VR: 44 | 65 | 65 |  |  |
| Polyamide 66 | VR: 35 |  | — | 65 | 65 |
| Polyamide 66 | VR: 22 |  |  |  |  |
| Polyamide 6 |  |  |  |  |  |

TABLE 2-continued

| | | | | | |
|---|---|---|---|---|---|
| Inorganic filler | GF: fiber minor diameter 10 μm, binder: acid copolymer, treated with amino silane | 35 | 35 | 35 | 35 |
| | GF: fiber minor diameter 10 μm, binder: urethane resin, treated with amino silane | | | | |
| | GF: fiber minor diameter 10 μm, binder: acid copolymer, treated with epoxy silane | | | | |
| | GF: fiber minor diameter 13μm, binder: acid copolymer, treated with epoxy silane | | | | |
| | wollastonite, treated with amino silane | | | | |
| Liquidity improver | STRUKTOLTR-063A | 1 | 7 | | |
| | LIONON | | | 0.5 | |
| | ZnO | | | | 3 |
| Lubricant | calcium stearate | | | | |
| Solidifying point | Tc | 216 | 217 | 215 | 216 |
| Spiral flow value | 285° C., 80° C., 70 MPa | 46 | 70 | 51 | 62 |
| SFD | 295° C., 80° C., 70 MPa | | | | |
| Creep strain | | 3.1 | 3.2 | 3.4 | 3.4 |
| Formic acid relative viscosity VR | | 41 | 26 | 35 | 29 |
| Tensile strength TS | MPa | 210 | 198 | 198 | 197 |
| Warpage test | | B | un-moldable | B | un-moldable |
| Oil leak test | 23° C., 50% RH | B | | B | |
| | 120° C., 1000 hrs | B | | B | |
| Bend creep test | 23° C., 40 MPa | A | A | A | A |
| Vibration fatigue test | 120° C., 80 MPa | A | A | A | C |

| | | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|
| Polyamide 66 | VR: 44 | 65 | 52 | | | | |
| Polyamide 66 | VR: 35 | | | 50 | 50 | 40 | 40 |
| Polyamide 66 | VR: 22 | | | | | | |
| Polyamide 6 | | | 13 | | | | |
| Inorganic filler | GF: fiber minor diameter 10 μm, binder: acid copolymer, treated with amino silane | 35 | 35 | 50 | 50 | 60 | 60 |
| | GF: fiber minor diameter 10 μm, binder: urethane resin, treated with amino silane | | | | | | |
| | GF: fiber minor diameter 10 μm, binder: acid copolymer, treated with epoxy silane | | | | | | |
| | GF: fiber minor diameter 13 μm, binder: acid copolymer, treated with epoxy silane | | | | | | |
| | wollastonite, treated with amino silane | | | | | | |
| Liquidity improver | STRUKTOL TR-063A | | | | 4 | | 3 |
| | LIONON | | | | | | |
| | ZnO | | | | | | |
| Lubricant | calcium stearate | 0.2 | | | | | |
| Solidifying point | Tc | 216 | 208 | 215 | 216 | 216 | 215 |
| Spiral flow value | 285° C., 80° C., 70 MPa | 30 | 61 | 34 | 45 | | |
| SFD | 295° C., 80° C., 70 MPa | | | | | 12 | 21 |
| Creep strain | | 3 | 4.2 | 2.8 | 2.7 | 2.5 | 2.6 |
| Formic acid relative viscosity VR | | 44 | 35 | 35 | 28 | 35 | 25 |
| Tensile strength TS | MPa | 205 | 193 | 248 | 250 | 255 | 257 |
| Warpage test | | B | A | C | un-moldable | C | un-moldable |
| Oil leak test | 23° C., 50% RH | B | A | A | | B | |
| | 120° C., 1000 hrs | B | C | C | | B | |
| Bend creep test | 23° C., 40 MPa | A | C | A | A | A | A |
| Vibration fatigue test | 120° C., 80 MPa | A | C | A | B | A | B |

As shown in Table 1, the polyamide resin compositions of the disclosure had superior liquidity, mechanical strength, and creep characteristics, as well as good results of the warpage test, the oil leak test, the bend creep characteristics test, and the vibration fatigue test. In contrast, as shown in Table 2, the polyamide resin compositions of the comparative examples failed to achieve good liquidity, mechanical strength, and creep characteristics, and good results of the warpage test, the oil leak test, and the vibration fatigue test at the same time. Further, the polyamide resin compositions of Comparative Examples 6, 8, 10, 14, and 16 failed to form samples to be used in the warpage test and the oil leak test.

Comparative Examples 1, 5, 7, 9, 11, 13, and 15 achieved sufficient strength; however, traces of oil were observed in the oil leak test. Comparative Examples 2, 3, 4, and 12 achieved high liquidity; however, they failed to achieve sufficient strength, and traces oil were observed after heated in the oil leak test.

INDUSTRIAL APPLICABILITY

The polyamide resin composition of the disclosure is suitably usable for, for example, automobiles, mechanical engineering, electric and electronic devices, industrial materials, engineering materials, and articles for daily and home use. In particular, the polyamide resin composition of the disclosure, which has good liquidity and high creep characteristics, can be suitably used as a material forming, for example, a cylinder head cover and an oil pan having an average product thickness of 2 mm or less, which are required to have oil leak resistance, and various parts in an engine room of automobiles; a head rest component, which is required to have deformation resistance to serve as a guard against whiplash symptoms in case of a car-to-car rear crash; an engine mount and a torque rod, which are required to have superior creep characteristics and vibration fatigue characteristics to endure vibration from the engine; a resonator, which is required to have thermal deformation resistance and creep deformation resistance to decrease sound pressure at a resonant frequency that exerts adverse effect to a human body during driving; and a timing chain component and a timing belt component, which are required to have creep deformation resistance to hold a chain in a precise position at a precise pressure.

EXPLANATION OF THE REFERENCE NUMERALS

1: top portions of cylinder head cover
2: flange portion
3: bolt insertion holes
4: oil filler cap mounting hole
5: spark plug insertion holes
10: cylinder head cover
11: gate
12: cut area

The invention claimed is:

1. A polyamide resin composition comprising (A) a polyamide resin and (B) an inorganic filler, wherein:
   the (A) polyamide resin comprises polyamide 66 in an amount of 90 mass % or more relative to 100 mass % of the polyamide resin and a liquidity improver in an amount of from 0.1 to 10 mass % relative to 100 mass % of the polyamide resin;
   the (B) inorganic filler is contained in an amount of 30 mass % or more relative to 100 mass % of the polyamide resin composition;
   the polyamide resin composition has a solidifying point of 210° C. or more;
   the polyamide resin composition has a spiral flow value in a flat spiral mold having a cavity width of 10 mm and a thickness of 2 mm, the spiral flow value being 60 cm or more under the conditions of a set temperature of 285° C., a mold temperature of 80° C., and an injection pressure of 70 MPa when the content of the (B) inorganic filler is 30 mass % or more and less than 40 mass %, being 40 cm or more under the conditions of a set temperature of 285° C., a mold temperature of 80° C., and an injection pressure of 70 MPa when the content of the (B) inorganic filler is 40 mass % or more and not greater than 50 mass %, and being 20 cm or more under the conditions of a set temperature 295° C., a mold temperature of 80° C., and an injection pressure of 70 MPa when the content of the (B) inorganic filler is greater than 50 mass % and not greater than 70 mass %;
   the polyamide resin composition has a strain of 3.8% or less measured in a 1000-hour tensile creep test under the conditions of 120° C. and 60 MPa, and
   the polyamide resin composition has a formic acid relative viscosity VR in the range of 30<VR<40.

2. The polyamide resin composition as claimed in claim 1, wherein the polyamide resin composition also has a tensile strength that is measured according to ISO 527, the tensile strength being greater than 195 MPa when the content of the (B) inorganic filler is 30 mass % or more and less than 40 mass %, being greater than 240 MPa when the content of the (B) inorganic filler is 40 mass % or more and not greater than 50 mass %, and being greater than 250 MPa when the content of the (B) inorganic filler is greater than 50 mass % and not greater than 70 mass %.

3. The polyamide resin composition as claimed in claim 1, wherein the (B) inorganic filler comprises glass fiber.

4. The polyamide resin composition as claimed in claim 3, wherein the glass fiber has an average minor diameter of 12 μm or less.

5. The polyamide resin composition as claimed in claim 3, wherein the glass fiber comprises an acid copolymer as a binder.

6. The polyamide resin composition as claimed in claim 1, wherein the (B) inorganic filler is surface-treated with an amino silane.

7. A cylinder head cover produced by molding the polyamide resin composition as claimed in claim 1 and having an average product thickness of 2 mm or less.

8. An oil pan produced by molding the polyimide resin composition as claimed in claim 1.

9. An engine mount or a torque rod produced by molding the polyamide resin composition as claimed in claim 1.

10. A head rest component produced by molding the polyamide resin composition as claimed in claim 1.

11. A resonator produced by molding the polyamide resin composition as claimed in claim 1.

12. A timing chain component or a timing belt component produced by molding the polyamide resin composition as claimed in claim 1.

13. The polyamide resin composition as claimed in claim 2, wherein the (B) inorganic filler comprises glass fiber.

14. The polyamide resin composition as claimed in claim wherein the (B) inorganic tiller is surface-treated with an amino silane.

15. The polyamide resin composition as claimed in claim 13, wherein the glass fiber has an average minor diameter of 12 μm or less.

16. The polyamide resin composition as claimed in claim 13, wherein the glass fiber comprises an acid copolymer as a binder.

* * * * *

UNITED STATES PATENT AND TRADEMARK OFFICE
CERTIFICATE OF CORRECTION

PATENT NO. : 11,299,603 B2
APPLICATION NO. : 16/342784
DATED : April 12, 2022
INVENTOR(S) : Miho Konishi et al.

It is certified that error appears in the above-identified patent and that said Letters Patent is hereby corrected as shown below:

In the Claims

Column 21, Line 42 (Claim 1, Line 4), change "mass or" to -- mass % or --

Column 22, Line 3 (Claim 1, Line 25), change "temperature 295°" to -- temperature of 295° --

Column 22, Lines 50-51 (Claim 14, Lines 1-2), change "claim wherein" to -- claim 2, wherein --

Signed and Sealed this
Eleventh Day of October, 2022

Katherine Kelly Vidal
*Director of the United States Patent and Trademark Office*